United States Patent [19]
O'Herin, Jr. et al.

[11] Patent Number: 5,857,656
[45] Date of Patent: Jan. 12, 1999

[54] LIVESTOCK OR POULTRY HOUSE HEATER SUSPENSION SYSTEM

[75] Inventors: Michael J. O'Herin, Jr., Grove, Okla.; Gary L. Anderson, Rogers, Ak.; David R. Andrews, Neosho, Mo.

[73] Assignee: Sibley Industries, Inc., Anderson, Mo.

[21] Appl. No.: 866,711

[22] Filed: May 30, 1997

[51] Int. Cl.[6] .................................................. A01K 41/02
[52] U.S. Cl. ..................... 248/317; 248/316.4; 248/302
[58] Field of Search .................................. 248/317, 233, 248/302, 303, 307, 323, 318, 309.1, 316.4, 298.1; 119/52.2, 52.3, 57.8, 57.9, 52.1, 305, 306, 307, 315, 318, 319

[56] References Cited

U.S. PATENT DOCUMENTS

| D. 137,205 | 2/1944 | Petzke . | |
|---|---|---|---|
| 846,865 | 3/1907 | Rogers | 119/305 |
| 1,722,381 | 7/1929 | Laver et al. | 248/316.4 X |
| 1,917,371 | 7/1933 | Hill | 119/52.1 |
| 2,737,361 | 3/1956 | Petzke | 248/316.4 X |
| 3,429,306 | 2/1969 | Thompson | 126/92 |
| 3,563,206 | 2/1971 | Hermann | 119/32 |
| 3,691,996 | 9/1972 | Bowell | 119/32 |
| 4,037,815 | 7/1977 | DeLano | 248/316.4 X |
| 4,919,084 | 4/1990 | Maurice | 119/32 |

OTHER PUBLICATIONS

Sibley Sierra Sales Brochure first used Jun. 1993.

*Primary Examiner*—Derek J. Berger
*Assistant Examiner*—Stephen S. Wentsler
*Attorney, Agent, or Firm*—Robert R. Keegan; Head, Johnson & Kachigian

[57] ABSTRACT

A suspension apparatus is provided for hanging a space heater having a generally circular top cover for use in a livestock or poultry house. The suspension apparatus is designed to decrease the distance from a support cable end to the top of a space heater, thereby increasing the clearance between the space heater and the floor of the animal house. The suspension apparatus includes a Y-shaped member having a first arm and a second arm that are substantially equal in length. The Y-shaped member additionally includes a third arm that is shorter than the first and second arms. The first, second and third arms of the Y-shaped member are substantially in a common plane. An extension arm is provided, which is slidably mounted on and in parallel relation to the third arm of the Y-shaped member. The first and second arms of the Y-shaped member and the extension arm are engageable with apertured tabs typically provided on a top cover of a space heater. A hook element is fashioned on the extension arm. The hook element is designed to be in close proximity to the top cover of the space heater. The hook element may be horizontally adjusted by sliding the extension arm parallel to the third arm, thereby balancing the space heater when the heater is suspended by a cable or other means.

16 Claims, 3 Drawing Sheets

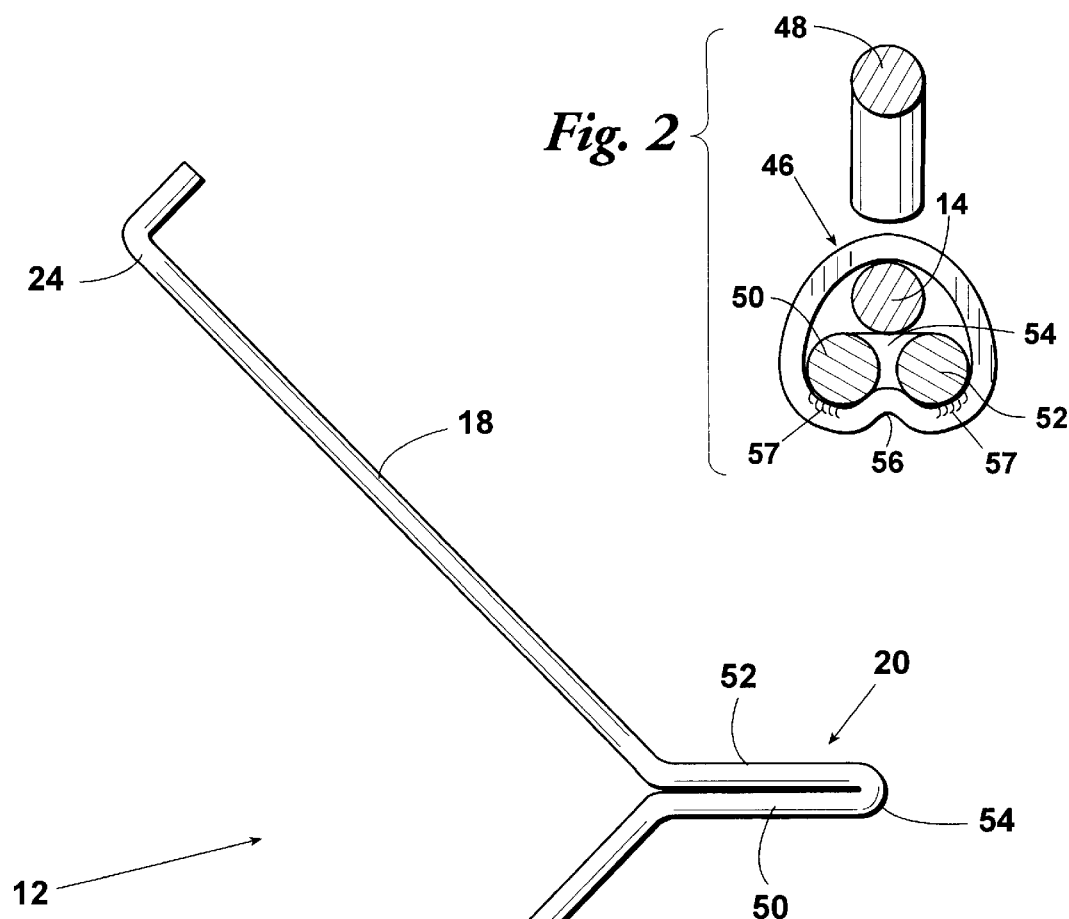
Fig. 2
Fig. 6
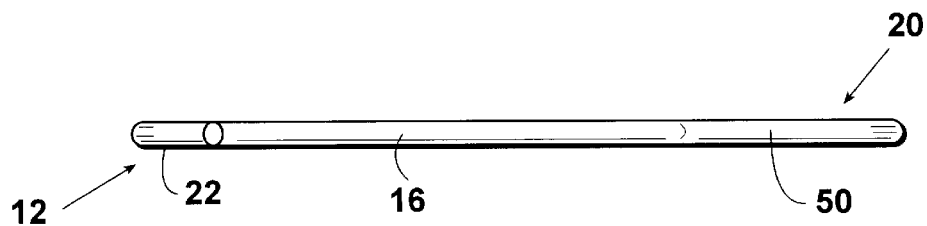
Fig. 7

5,857,656

LIVESTOCK OR POULTRY HOUSE HEATER SUSPENSION SYSTEM

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to an apparatus for hanging a space heater. More particularly, the invention relates to a suspension apparatus for hanging space heaters that have a generally circular top cover, wherein the suspension apparatus allows for a reduction in a vertical distance from a supporting means to the space heater versus conventional suspension apparatus.

2. Prior Art

Previous space heater suspension apparatuses have utilized a plurality of chains and/or other suspension means for connection to a hanging support, typically an end of a cable for raising and lowering a group of heaters. The plurality of suspension means is typically affixed to three attachment points on an upper surface of a space heater. A disadvantage of this system is that an individual chain or suspension means must be adjusted independently to level the space heater, and the heater is suspended at a lower position by the effective length of the chains.

The system of the present invention permits elimination of the chains associated with prior systems. The present system utilizes bent rods that are engaged on each end to at least three positions on an upper surface of the space heater. An advantage of the present system is that at least about six inches in extra height added to the space heater by the prior chains and/or rod is reduced to about one inch. The advantage of minimizing the distance to the space heater from a hanging point is that clearance from the bottom of the space heater to the floor is increased. It is particularly important to maximize clearance in a livestock house, such as a modern poultry house, because of the trend towards constructing such houses having low-dropped ceilings. When a poultry house or other structure must be cleaned out, it is beneficial to the grower or operator to have maximum clearance so that the use of equipment such as tractors, trucks, etc., is not restricted by low positions of hanging space heaters which have been raised by cable and winch to their highest position.

SUMMARY OF THE INVENTION

It is desired to provide a suspension system wherein the additional effective height added to a heater is minimized, thereby maximizing the distance from the floor of an agricultural animal house, such as a poultry house, to the bottom of a space heater (when in its raised position).

A further object of the invention is to provide a suspension means whereby the space heater may be easily leveled.

The suspension apparatus of the current invention accomplishes these objectives by providing a Y-shaped member wherein the first, second and third arms of the Y-shaped member are substantially in a common plane. The first and second arms are engaged at their end with engaging means, such as an apertured tab on a top cover of a space heater. A rod in the form of an extension arm is provided for engaging a third engaging means such as an apertured tab on the top cover of the space heater, and such rod is slidably mounted in a parallel relation along the third arm of the Y-shaped member. A hook element is fashioned on the extension arm.

A friction connector on the third arm of the Y-shaped member is slidably engaged with the extension arm. The friction connector serves as a friction lock, which is adapted to retard undesired movement of the extension arm relative to the third arm, and could be provided with a screw lock or clamping means if desired.

Since the arms of the Y-shaped member and the extension arm are substantially in a common plane, the entire suspension apparatus is positioned in close proximity to the generally circular top cover, thereby adding little additional height to the heater. The extension arm and associated hook element may be slidably adjusted to a position that facilitates balancing of the heater when the heater is suspended on a cable loop by the hook element.

BRIEF DESCRIPTION OF THE DRAWINGS

FIG. 2 is an enlarged cross-sectional view of the sleeve of a friction connector taken along line 2—2 therein in FIG. 1;

FIG. 6 is an enlarged top view of the Y-shaped member portion of the apparatus shown in FIG. 1 and FIG. 3; and FIG. 7 is a side elevational view of the Y-shaped member shown in FIG. 6.

DETAILED DESCRIPTION OF THE PREFERRED EMBODIMENTS

Figure 1:
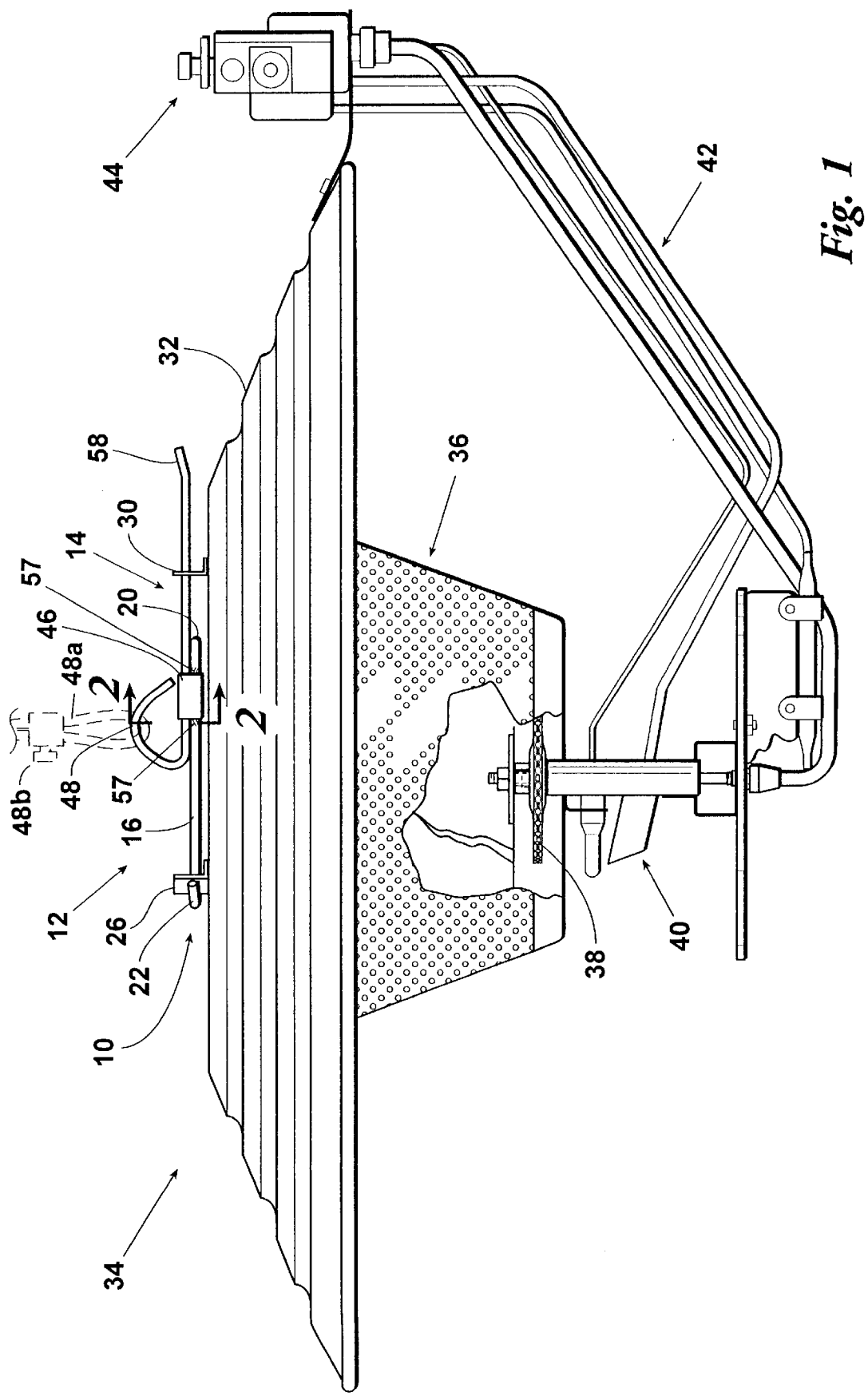
FIG. 1 is a side elevational view illustrating an exemplary embodiment of the apparatus of the invention mounted to a typical space heater.

Referring now to FIG. 1, the preferred embodiment of a suspension apparatus 10 includes a Y-shaped member 12 bent from metal, usually steel or stainless steel, rod stock and an extension arm 14 similarly formed. Y-shaped member 12 includes a first arm 16, a second arm 18 and a third arm 20 formed as shown. Preferably, first arm 16 is provided with first engagement element 22 formed by a bend in the rod stock and second arm 18 is provided with second engagement element 24 similarly formed. First arm 16, second arm 18 and extension arm 14 are positioned to engage first apertured tab 26, second apertured tab 28 and third apertured tab 30, respectively. Apertured tabs 26, 28 and 30 are typically situated on top cover 32 of a space heater 34 as shown in FIG. 1.

A typical space heater 34 includes radiant element 36, gas burner 38, pilot assembly 40, tubing 42, and gas supply element 44. It is important that space heaters are level when installed. To facilitate a balanced hanging point so that space heater 34 is suspended horizontally, suspension apparatus 10 is provided with a sleeve 46 acting as a friction connector to allow partially restrained movement of extension arm 14 with respect to third arm 20 of Y-shaped member 12. Such movement is effectively restrained only when the weight of space heater 34 is acting on extension arm 14.

Extension arm 14 is provided with a hook element 48. By causing extension arm 14 to slide horizontally with respect to Y-shaped member 12, hook element 48 may be easily positioned to balance space heater 34 when space heater 34 is suspended by hook element 48.

Referring now to FIG. 2, there is shown a cross-sectional view of sleeve 46 taken along line 2—2 of FIG. 1. Within sleeve 46 as shown in FIG. 2 is extension arm 14. Additionally, first component 50 and second component 52 of third arm 20 of Y-shaped member 12 are visible connected by bend 54 at the end of third arm 20 of Y-shaped member 12. Preferably, sleeve 46 is secured to Y-shaped member 12 by a weld 57 or in some other manner.

In the preferred embodiment, sleeve 46 is provided with a depression 56 to facilitate attachment with Y-shaped member 12. Preferably, sleeve 46 is designed to allow free movement of extension arm 14 when there is no weight on hook element 48. Also, sleeve 46 could be provided with a screw clamp or other device to manually clamp extension arm 14 relative to Y-shaped member 12.

Figure 3:
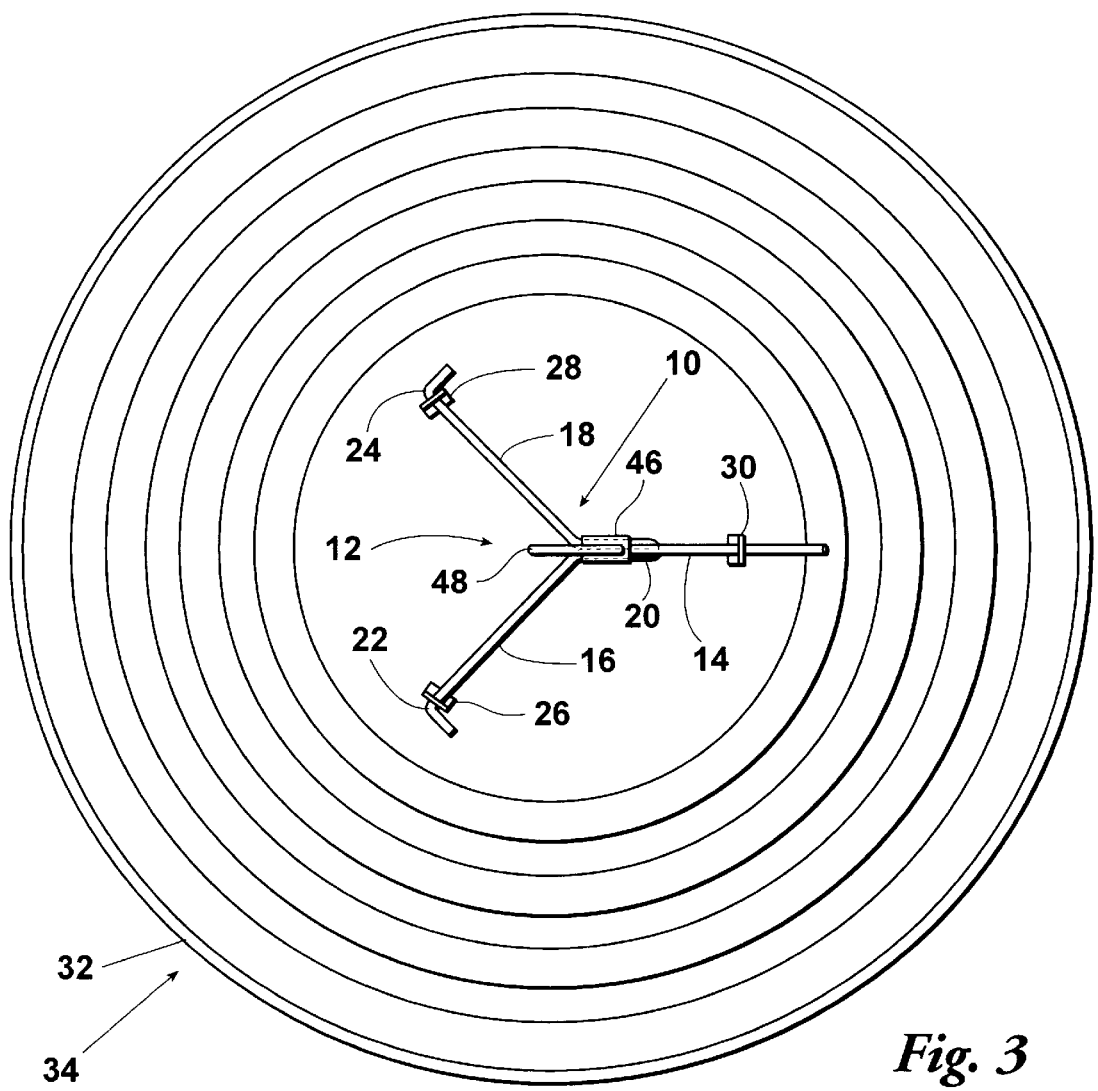
FIG. 3 is a top view of the apparatus shown mounted on a top cover of a typical space heater shown in FIG. 1.

Referring now to FIG. 3, Y-shaped member 12 is shown with first arm 16 engaged with first apertured tab 26 and second arm 18 engaged with second apertured tab 28. First engagement element 22 and second engagement element 24 insure that Y-shaped member 12 does not disengage from first apertured tab 26 and second apertured tab 28. Third arm 20 of Y-shaped member 12 is secured to and extends through sleeve 46 which is slidably engaged with extension arm 14. Extension arm 14 is slidably engaged with third apertured tab 30 to position hook element 48 such that the space heater 34 is balanced and will hang substantially level.

Figure 4:
FIG. 4 is an enlarged top view of the extension arm portion of the apparatus of FIG. 1 and FIG. 3.
Figure 5:
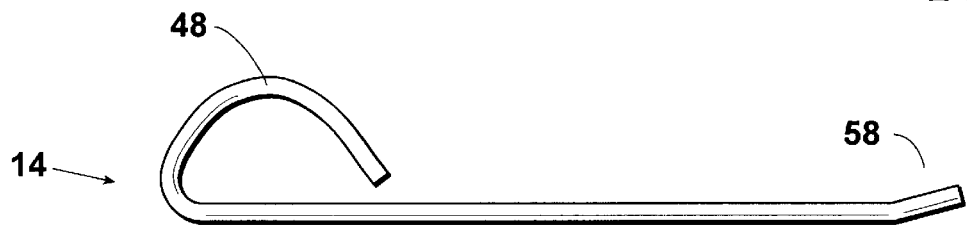
FIG. 5 is a side elevational view of the extension arm shown in FIG. 4.

Referring now to the FIG. 4 top view of extension arm 14, and the FIG. 5 side elevational view of extension arm 14, hook element 48 is formed on extension arm 14 as is engagement element 58. In the preferred embodiment, hook element 48 is shaped to form a generally semicircular hook or open loop having an opening about one inch across (so that it can be engaged and lifted by one finger). Extension arm 14 is preferably 6 to 7 inches in length, excluding the length of engagement element 58. It is noted that the dimensions stated herein are for purposes of example only and that the nature of the heater to be supported would indicate the desirable dimensions in each case.

Referring now to FIGS. 6 and 7, Y-shaped member 12 is shown having first arm 16, second arm 18, and third arm 20. Formed proximate an end of first arm 16 is first engagement element 22 and formed proximate an end of second arm 18 is second engagement element 24. In the preferred embodiment, Y-shaped member 12 is comprised of a single piece of stainless steel or galvanized steel rod, preferably about 3/16 inch in diameter.

Y-shaped member 12 is bent to form third arm 20 by bend 54. Third arm 20 is formed from first component 50, second component 52 and bend 54. In the preferred embodiment, first arm 16 and second arm 18 are substantially equal in length and preferably about 8 to 9 inches in length. Third arm 20 is preferably about 2 to 3 inches in length. Also in the preferred embodiment, the distance between first engagement element 22 and second engagement element 24 is about 12 inches.

In practice, first arm 16 and second arm 18 are positioned within first apertured tab 26 and second apertured tab 28, which are typically positioned on top cover 32 of space heater 34. Apertured tabs 26 and 28 may be secured to cover 32 as shown or may extend through cover 32 from below. Extension arm 14 is slidably engaged with third apertured tab 30 and is horizontally adjustable so that hook element 48 may be positioned so that space heater 34 is balanced and level when space heater 34 is supported by hook element 48. By engaging hook element 48 with cable 48*a* formed in a loop by clamp 48*b* to support space heater 34, space heater 34 may be positioned nearer a ceiling or other supporting means, thereby maximizing the clearance between space heater 34 and the floor of a poultry house or the like.

Whereas, the present invention has been described in relation to the drawings attached hereto, it should be understood that other and further modifications, apart from those shown or suggested herein, may be made within the spirit and scope of this invention.

What is claimed is:

1. A suspension apparatus for hanging a space heater having at least three aperture support elements at the top thereof comprising:

(a) a Y-shaped member having a first arm, a second arm, and a third arm, said first, second, and third arms being substantially in a common plane, said first arm, and said second arm each adapted to engage one of said support elements on said heater, said first arm and said second arm being substantially equal in length, and said third arm being shorter than said first arm;

(b) a friction connector secured to said third arm;

(c) an extension arm adapted to engage one of said support elements on said heater and slidably received by said friction connector, thereby slidably maintaining said extension arm in parallel relation with said third arm; and (d) a hook element in said extension arm.

2. Apparatus as recited in claim 1, wherein said Y-shaped member is formed of a single piece of metal rod.

3. Apparatus as recited in claim 1, wherein said first arm and said second arm each have an engagement element near an end thereof.

4. Apparatus as recited in claim 3, wherein said Y-shaped member is formed of a single piece of metal rod.

5. Apparatus as recited in claim 1, wherein said extension arm is formed of a single piece of metal rod and said hook element is formed as an arcuate bend in said rod.

6. Apparatus as recited in claim 5, wherein said first arm and said second arm each have an engagement element near an end thereof.

7. Suspension apparatus for hanging a space heater having a top cover and three apertures thereon comprising:

(a) a Y-shaped member having a first arm, a second arm substantially equal in length to said first arm, and a third arm shorter than said first arm, said first, second, and third arms being substantially in a common plane;

(b) said first arm and said second arm each having an engagement element near an end thereof adapted to engage respective ones of said apertures on said top cover;

(c) an extension arm longer than said third arm;

(d) a connector for slidably mounting said extension arm in parallel relation along said third arm; and (e) a hook element on said extension arm;

whereby said suspension apparatus may be assembled and configured to engage said three apertures conventionally provided on the top cover of a hanging space heater with said hook element in close proximity to said top cover in an adjustable position that facilitates balancing the heater when suspended by said hook element.

8. Apparatus as recited in claim 7, wherein said Y-shaped member is formed of a single piece of metal rod.

9. Apparatus as recited in claim 8, wherein said first arm and said second arm each have an engagement element near an end thereof.

10. Apparatus as recited in claim 9, wherein said extension arm is formed of a single piece of metal rod and said hook element is formed as an arcuate bend in said rod.

11. Apparatus as recited in claim 7, wherein said first arm and said second arm each have an engagement element near an end thereof.

12. Apparatus as recited in claim 7, wherein said extension arm is formed of a single piece of metal rod and said hook element is formed as an arcuate bend in said rod.

13. Suspension apparatus for hanging a space heater having a top cover and three apertures thereon comprising:

(a) a Y-shaped member having a first arm, a second arm substantially equal in length to said first arm, and a third arm shorter than said first arm, said first, second, and third arms being substantially in a common plane;

(b) said first arm and said second arm each having an engagement element near an end thereof adapted to engage respective ones of said apertures on said top cover;

(c) an extension arm longer than said third arm;

(d) a connector for slidably mounting said extension arm in parallel relation along said third arm;

(e) a hook element on said extension arm; and (f) said connector being adapted to retard movement of said extension arm relative to said third arm at least when the weight of said space heater is supported by said hook element;

whereby said suspension apparatus may be assembled and configured to engage said three apertures conventionally provided on the top cover of said hanging space heater with said hook element in close proximity to said top cover in an adjustable position that facilitates balancing the heater when suspended by said hook element.

14. Apparatus as recited in claim 13, wherein said Y-shaped member is formed of a single piece.

15. Apparatus as recited in claim 14, wherein said first arm and said second arm each have an engagement element near an end thereof.

16. Apparatus as recited in claim 13, wherein said first arm and said second arm each have an engagement element near an end thereof.

* * * * *